Feb. 26, 1957 H. BODE 2,783,381

FREQUENCY DIVIDER CIRCUIT FOR MUSICAL INSTRUMENTS

Filed July 6, 1954 2 Sheets-Sheet 1

Harold Bode, Inventor

Harald Bode, Inventor 2,783,381

FREQUENCY DIVIDER CIRCUIT FOR MUSICAL INSTRUMENTS

Harald Bode, Brattleboro, Vt., assignor, by mesne assignments, to Estey Organ Corporation (Del.), New York, N. Y., a corporation of Delaware Application July 6, 1954, Serial No. 441,252

18 Claims. (Cl. 250—36)

This invention relates to a frequency divider for an electronic musical instrument.

Basically, oscillator circuits employing glow discharge tubes and adapted to provide output signals having various waveforms are known in the art. As a matter of fact, it is also known to provide a resonant circuit in the anode circuit of a glow discharge oscillator in order to improve its frequency stability as compared with that of more conventional glow discharge oscillators which employ only resistive and capacitive elements. Although the frequency stability of a glow discharge oscillator which includes a resonant circuit may be adequate for some applications, it is not as stable as is desirable in an electronic musical instrument application. Where a synchronized glow discharge oscillator having only resistive and capacitive elements is employed, on the other hand, the difficulty is that only output signals of relatively high harmonic content may be obtained.

According to the invention, therefore, it is proposed to provide a glow discharge oscillator which is not only synchronized by a master oscillator, the latter generating fundamental tone signals, whereas the former being utilized to generate a sub-harmonic signal representing a sub-harmonic of the fundamental tones, but also has a resonant circuit of novel configuration to obtain from the frequency divider, output signals for use as tones which have relatively low harmonic content as well as signals having relatively high harmonic content. As will appear, there is also provided according to the invention means to match the impedance of the resonant circuit from which the output signals of relatively low harmonic content are derived to the output impedance of the glow discharge oscillator or frequency divider so as to obtain optimum power transfer.

The novel features of the invention, together with the objects and advantages thereof, will become more readily apparent when considered in connection with the accompanying drawings in which.

Figure 1:
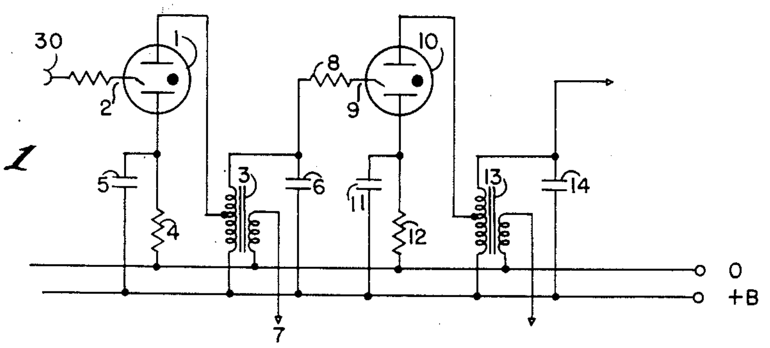
Fig. 1 is a schematic diagram of a two-stage chain of glow discharge oscillators or frequency dividers according to the invention.
Figure 4:
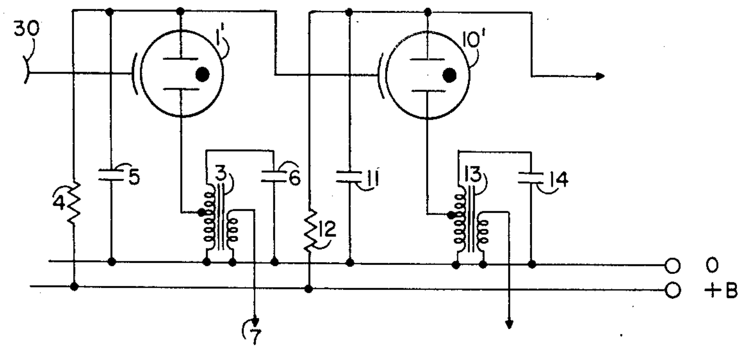
Fig. 4 is a schematic diagram of a modification of the two-stage frequency divider chain of Fig. 4 in accordance with the invention.
Figure 5:
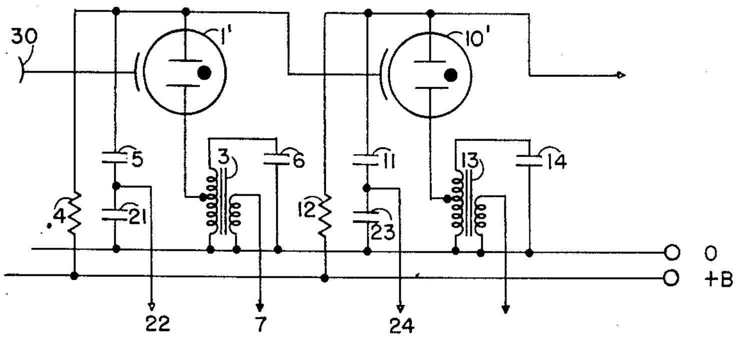
Figure 6:
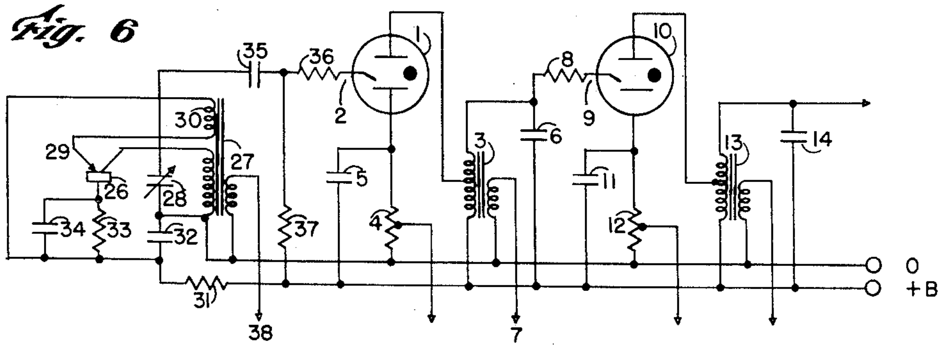

Fig. 5 is a schematic diagram of a two-stage frequency divider chain like that shown in Fig. 4 with the addition of voltage dividing means whereby an output signal of relatively high harmonic content is derived; and Fig. 6 is a schematic diagram of a two-stage frequency divider chain similar to that shown in Fig. 1, in combination with a transistor master oscillator to provide fundamental tone signals and to synchronize the first of the frequency divider stages.

Referring now to the drawings and more particularly to Fig. 1, it will be observed that numeral 1 designates a glow discharge device having a control electrode 2, and numeral 10 represents a second glow discharge device like that designated by the numeral 1, the control electrode of the latter being designated by the numeral 9. The glow discharge devices 1 and 10 are each adapted to operate as frequency dividers, the latter being synchronized by the output signal from the former and the former being synchronized by a master oscillator (not shown) which provides a synchronizing output signal between a terminal 30 and ground, as represented by the terminal 0. To this end, there is applied to the anode of the glow discharge device or triode 1, a positive potential derived from a B+ terminal and produced by any convenient voltage source connected between the 0 and B+ terminals. Specifically, a portion of the primary winding of a transformer 3 is connected between the B+ terminal and the anode, the primary winding being provided with a tap for this purpose. The cathode of triode 1, on the other hand, is connected to the B+ terminal through a capacitor 5 and to the 0 or ground terminal through a resistor 4. As is apparent, the secondary winding associated with transformer 3 provides a means of obtaining an output signal from the resonant circuit formed with the primary winding of the transformer 3 and a capacitor 6, which is connected in parallel therewith.

By properly proportioning resistor 4 and capacitor 5, triode 1 may be caused to oscillate very nearly at a sub-harmonic of the synchronizing frequency, such as, for example, the first sub-harmonic, owing to the alternate charging of capacitor 5 through resistor 4 and the discharge thereof through the anode circuit of the triode. By providing in addition a synchronizing signal at terminal 30, it follows that triode 1 may be caused to oscillate at a frequency precisely half that of the synchronizing signals, and hence there will be present across the resonant circuit, including the primary winding of transformer 3 and capacitor 6, a very nearly sinusoidal output signal of the same frequency. It is preferable that the natural or free-running frequency of the glow discharge oscillator formed with triode 1 be slightly less than one-half the synchronizing frequency so that ignition of the triode is always somewhat dependent on the synchronizing signal and not on the time constant of elements 4 and 5 only. On the other hand, the resonant circuit in the anode circuit is tuned precisely to the desired operating frequency. Although a resistor has been illustrated between the terminal 30 and the control electrode 2 of triode 1, this may be omitted if the control electrodes of the particular type triodes being employed are relatively small since, in this event, there will be less tendency of the signal developed by the frequency divider to be reflected in the preceding stage, namely, the master oscillator.

It will be apparent to those skilled in the art that the circuitry associated with the glow discharge device or triode 10 is the same as that aforementioned in connection with triode 1, there being provided a resistor 8 between one end of the resonant circuit associated with triode 1 and the control electrode 9 of triode 10 to synchronize the latter. Accordingly, triode 10 functions in precisely the same manner as does triode 1, except that its synchronizing signal is derived from the latter. Ordinarily, therefore, resistor 12 and capacitor 11 will be so proportioned as to cause the natural frequency of the oscillations produced by triode 10 to be slightly less than half the frequency of the signals produced by triode 1, whereas the resonant circuit associated with triode 10, including the primary winding of transformer 13 and capacitor 14, will be tuned to precisely half the frequency of triode oscillator 1. It is quite significant in each of the above-described frequency divider stages that means are provided to match the impedance of each resnoant circuit to the output impedance of its corresponding triode. That is to say, by providing the primary windings of transformers 3 and 13 with taps so that only a portion of the primary windings are in series with the respective anode circuits, the relatively high impedances of the resonant circuits appear relatively low as viewed by the triodes, as is required for optimum power transfer.

It should be recognized that according to the invention whether the primary frequency controlling R-C combination of elements 4 and 5, in the case of triode 1, and elements 11 and 12, in the case of triodes 10, are connected to the cathode as in Fig. 1, or connected to the anode, is immaterial. As a matter of fact, my invention is susceptible of various modifications within its spirit and scope, such as, for example, the modification shown in Fig. 2.

Figure 2:
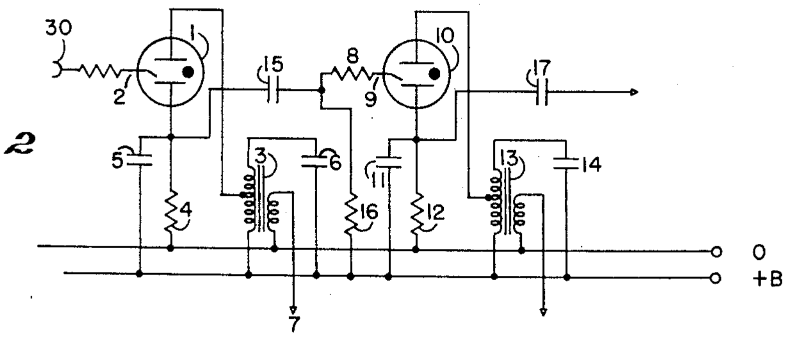
Fig. 2 is a schematic diagram similar to Fig. 1, except that the coupling circuit between the frequency divider stages has been modified in accordance with the invention.

Referring now to Fig. 2, it will be observed that a slightly different coupling arrangement between the triodes 1 and 10 is employed. More particularly, there is provided a capacitor 15 between the cathode of triode 1 and the control electrode resistor 8 of triode 10. In addition, there is provided a resistor 16 connected between the B+ terminal and the junction of capacitor 15 and the resistor 8 for properly biasing triode 10.

Figure 3:
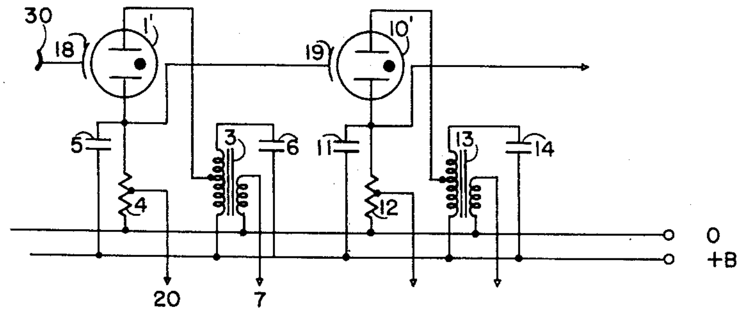
Fig. 3 is a schematic diagram of a two-stage frequency divider chain employing glow discharge devices with external control electrodes according to the invention.

As previously mentioned, in addition to output signals of relatively low harmonic content which are available at the resonant circuits, output signals of relatively high harmonic content may be obtained from the R-C circuits. This has been illustrated specifically in Fig. 3, wherein the frequency controlling resistor 4 is provided with a tap from which such output signals may be derived. Of course, the same is equally applicable to the arrangements of Figs. 1 and 2, although in the arrangement of Fig. 3, the invention has been illustrated in connection with glow discharge devices 1' and 10' having external control electrodes. Also in accordance with a modification aforementioned, Fig. 4 illustrates elements 4 and 5 in an anode connection rather than the cathode connection of Figs. 1, 2, and 3. In this case, it will be necessary to derive output signals of relatively high harmonic content somewhat differently, such as, for example, by the scheme shown in Fig. 5.

With reference to Fig. 5, it will be observed that instead of a single capacitor connected between each of the respective anodes of triodes 1 and 10 and ground, there are provided additional capacitors 21 and 23 which serve in combination with capacitors 5 and 11, respectively, as voltage dividers. That is to say, capacitor 21 is connected between capacitor 5 and ground on the one hand, whereas capacitor 23 is connected between capacitor 11 and ground on the other. Thus an output connection can be made to the junction of each pair of series connected capacitors, as with leads 22 and 24, from which signals of relatively high harmonic content may be obtained. It will also be recognized by those skilled in the art that the particular type of oscillator used to generate fundamental tones and to synchronize the glow discharge oscillators, or frequency dividers, hereinbefore described and illustrated, is more or less optional and may or may not comprise an oscillator of the glow discharge or relaxation type. For that matter, it is preferable that a master or control oscillator different from a glow discharge relaxation oscillator be employed in order to achieve greater frequency stability. According to this invention it is, of course, completely irrelevant whether the frequency-determining first stage of the divider chain is also equipped with a glow lamp or with any other generators producing alternating voltage. The circuit example in Figure 6 shows one of the possible embodiments, namely a transistor connected as a frequency-determining generator. The transistor 25 is provided with a collector 26 connected to the oscillating circuit, consisting of coil 27 and condenser 28 while the emittor 29 is connected to the reactance coil 30. On account of the far lower transistor voltage, as compared with the glow lamp voltage, a voltage divider may be provided between the positive and zero voltage lines. The operating voltage is blocked by the condenser 32 if necessary. The basic resistor 33 is bridged with condenser 34 and the emittor 29 is thereby given the requisite positive pre-priming potential. The oscillations generated are tapped at the end of coil 27 connected to the commutator or collector and directed over condenser 35 and resistor 36 to the ignition electrode 2 of the glow lamp 1. This ignition electrode is given its positive pre-priming potential through the resistor 37. The oscillations poor in upper tones generated in the transistor oscillating circuit are supplied to the line 38 by a coil coupled to the inductance 27. The oscillations poor in upper tones of the glow lamp circuit are obtained from the coils belonging to the resonance transmitters thereof, and the oscillations rich in upper tones of the glow lamp circuits are obtained from the resistance taps 4 and 12. An alternating voltage rich in upper tones can also be tapped at the base of the transistor, if the blocking condenser 34 is omitted.

The advantage of using a transistor circuit consists in the fact that, like the glow lamps, it requires no filament voltage supply. As a matter of fact, it is, of course, also possible to have the basic resistance of the transistor at zero potential and the resistor 31 in Figure 6 at a negative voltage. Here, too, in a known manner, one may impart upon the frequency-determining generator a separate voltage feed, in order to modulate the operating voltage in the rhythm of a vibrato frequency for generating frequency vibrato.

Because such an arrangement according to the circuit shown in Figure 6 operates with a relatively low output, and does not overheat, a very condensed construction is possible, so that, for example, one divider chain may be housed in a closed container, which, if possible, is even lead-sealed, and which by attachment of a multiple plug can be replaced rapidly and easily.

Various other modifications within the spirit and scope of the invention will occur to those skilled in the art.

Therefore, what is claimed is:

1. In an electronic musical instrument, a frequency divider to generate subharmonics of signals representing musical tones, said frequency divider comprising a relaxation oscillator adapted to oscillate at a predetermined subharmonic of said musical tones, said oscillator employing a glow discharge device having an anode circuit and a control circuit whereon said tone signals are impressed; and a parallel resonant circuit coupled to the anode circuit of said glow discharge device and adapted to provide subharmonic tone signals of relatively low harmonic content.

2. In an electronic musical instrument, a frequency divider to generate subharmonics of signals representing musical tones, said frequency divider comprising a glow discharge device having an anode circuit and a control circuit; oscillatory circuit means to cause said discharge device to conduct repetitively at a rate corresponding very nearly to a predetermined subharmonic of said tone signals; means to impress said tone signals on said control circuit so that said discharge device is caused to conduct repetitively at a rate corresponding precisely to said predetermined subharmonic; and a parallel resonant circuit coupled to said anode circuit and adapted to provide a subharmonic tone signal of relatively low harmonic content.

3. A frequency divider according to claim 2 wherein said resonant circuit includes an inductor and a capacitor connected in parallel with one another, said inductor being provided with a tap for connecting a portion of same in said anode circuit, thereby to match the high impedance of said tank circuit to the relatively low output impedance of said oscillator.

4. In an electronic musical instrument, a frequency divider to generate subharmonics of signals representing musical tones, said frequency divider comprising a glow discharge device having an anode, a cathode and control electrode; a source of anode voltage having positive and negative terminals; a capacitive element connected between said cathode and said positive terminal, a resistive element connected between said cathode and said negative terminal; and a parallel resonant circuit including a tapped inductive element, a portion of said conductive element between one end thereof and the tap thereon being coupled between said positive terminal and said anode, said resistive element and said capacitive element being so proportioned relatively to one another as to cause said glow discharge device to oscillate at a frequency very nearly the same as a predetermined subharmonic of said tone signals, said tone signals being impressed across the control electrode and cathode of said glow discharge device to synchronize same at said predetermined subharmonic frequency, and said parallel resonant circuit being tuned to said subharmonic and adapted to provide subharmonic tone signals of relatively low harmonic content.

5. In an electronic musical instrument, a frequency divider to generate subharmonics of signals representing musical tones, said frequency divider comprising a glow discharge device having an anode, a cathode and a control electrode; a source of anode voltage having positive and negative terminals; a capacitive element connected between said anode and said negative terminal; a resistive element connected between said anode and said positive terminal; and a parallel resonant circuit including a tapped inductive element, a portion of said inductive element between one end thereof and the tap thereon being coupled between said positive terminal and said anode, said resistive element and said capacitive element being so proportioned relative to one another as to cause said glow discharge device to oscillate at a frequency very nearly the same as a predetermined subharmonic of said tone signals, said tone signals being impressed across the control electrode and cathode of the glow discharge device to synchronize the same at said predetermined subharmonic frequency, and said parallel resonant circuit being tuned to said subharmonic frequency and adapted to provide subharmonic tone signals of relatively low harmonic content.

6. In an electronic musical instrument, a frequency divider to generate subharmonics of signals representing musical tones, said frequency divider comprising a glow discharge device having an anode, a cathode and a control electrode; a source of anode voltage having positive and negative terminals; a capacitive element connected between said cathode and said positive terminal; resistive voltage dividing means connected between said cathode and said negative terminal; and a parallel resonant circuit including a tapped inductive element, a portion of said inductive element between one end thereof and the tap thereon being coupled between said positive terminal and said anode, said resistive voltage dividing means and said capacitive element being so proportioned relative to one another as to cause said glow discharge device to oscillate at a frequency very nearly the same as a predetermined subharmonic of said tone signals, said tone signals being impressed across the control electrode and cathode of the glow discharge device to synchronize the same at said predetermined subharmonic frequency, said parallel resonant circuit being tuned to said subharmonic frequency and adapted to provide subharmonic tone signals of relatively low harmonic content, and said voltage dividing means being adapted to provide subharmonic tone signals of relatively high harmonic content.

7. A frequency divider circuit for musical instruments comprising a plurality of frequency divider stages each having a glow discharge tube, a capacitor and a resistor connected to each of said glow tubes, means for charging said capacitor through said resistor and for periodically discharging said capacitor through the glow tube associated therewith, a tank circuit connected to each glow discharge tube and having a high alternating current potential end, each said tank circuit having a self-inductance and a capacitor, said self-inductance having a high impedance winding, one electrode of each of said glow discharge tubes being connected to a tap of the high impedance winding of the tank circuit associated with the corresponding divider stage in order to obtain optimum impedance matching, and means for supplying to a succeeding divider stage part of the voltage from the tank circuit of the preceding divider stage to synchronize the stages.

8. A frequency divider circuit as set forth in claim 7 further characterized in that the glow discharge tubes each include an ignition electrode, and in each divider stage the charging resistor and the discharge capacitor are connected to the negative electrode of the glow discharge tube of that stage, while the tap of the tank circuit inductance is connected to the positive electrode of the glow discharge tube of that stage, and means for connecting the high alternating current potential end of the tank circuit inductance of a preceding divider stage through a resistor to the ignition electrode of the glow tube of the succeeding divider stage.

9. A frequency divider circuit as set forth in claim 8 further characterized in that the charging resistor and the discharge capacitor are connected to the negative electrode of the glow discharge tube in each divider stage and the ignition electrode of the succeeding stage glow discharge tube receives pulses through a capacitor and a resistor from the negative electrode of the preceding stage glow discharge tube, and means for supplying the positive bias voltage to the glow tube of each stage through an additional resistor.

10. A frequency divider circuit as set forth in claim 9 further characterized in that the glow discharge tubes of each divider stage are provided with ignition electrodes on the outside of the tubes, and means for connecting the outside electrode of each succeeding stage glow discharge tube directly to the negative electrode of the preceding stage glow discharge tube.

11. A frequency divider circuit as set forth in claim 10, further characterized in that the charging resistor and the discharge capacitor of each divider stage are connected to the positive electrode of the glow discharge tube of the corresponding stage and the tap of the tank circuit inductance of each stage is connected to the negative electrode of the glow discharge tube of that stage, the outside electrode of the succeeding stage glow discharge tube is directly connected to the positive electrode of the preceding stage glow discharge tube.

12. A frequency divider circuit as set forth in claim 7, further comprising a secondary winding coupled to the tank circuit inductance of each stage and means for deriving the alternating current voltage with low harmonic content from said secondary winding of any divider stage, and means for deriving the alternating current voltage with high harmonic content is from a tap of the charge resistor of any divider stage.

13. A frequency divider circuit, as set forth in claim 7, further comprising a capacitive voltage divider connected to each divider stage and means for deriving the alternating current voltage with high harmonic content from the capacitive voltage divider of any divider stage, said capacitive divider also functioning as the discharge capacitor.

14. A frequency divider circuit, as set forth in claim 7, further comprising a source of oscillations connected to the first divider stage, said source of oscillations comprising a transistor oscillator.

15. A frequency divider circuit as set forth in claim 14, further comprising means for connecting the oscillation circuit of the transistor to the ignition electrode of the first divider stage, said means including a capacitor and a resistor, and means for giving said first divider stage a positive bias voltage through an additional resistor.

16. A frequency divider circuit as set forth in claim 7, further characterized in that each frequency divider stage is housed in a closed container, and a multiple plug for each container connected to the divider stage therein for connecting that stage to the divider circuit.

17. An electronic musical instrument as set forth in claim 1 further comprising a transistor oscillation generator and means for connecting said transistor oscillation generator to the control circuit of said relaxation oscillator, said means including a capacitor and a resistor.

18. An electronic musical instrument as set forth in claim 2 further comprising a transistor oscillation generator and means for connecting said transistor oscillation generator to said glow discharge device, said means including a capacitor and a resistor.

References Cited in the file of this patent

UNITED STATES PATENTS

| | | |
|---|---|---|
| 2,017,542 | Langer | Oct. 15, 1935 |
| 2,044,360 | Langer | June 16, 1936 |
| 2,139,023 | Kock | Dec. 6, 1938 |